(12) United States Patent
Cooper

(10) Patent No.: US 12,000,373 B2
(45) Date of Patent: Jun. 4, 2024

(54) METHOD FOR MANUFACTURING WIND TURBINE TOWER STRUCTURE FOR PREVENTING VORTEX SHEDDING

(71) Applicant: General Electric Company, Schenectady, NY (US)

(72) Inventor: Gregory Edward Cooper, Greenfield Center, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 402 days.

(21) Appl. No.: 17/279,115

(22) PCT Filed: Sep. 28, 2018

(86) PCT No.: PCT/US2018/053477
§ 371 (c)(1),
(2) Date: Mar. 24, 2021

(87) PCT Pub. No.: WO2020/068124
PCT Pub. Date: Apr. 2, 2020

(65) Prior Publication Data
US 2021/0396213 A1    Dec. 23, 2021

(51) Int. Cl.
*F03D 13/10*        (2016.01)
*B33Y 10/00*        (2015.01)
(Continued)

(52) U.S. Cl.
CPC .............. *F03D 13/10* (2016.05); *B33Y 10/00* (2014.12); *B33Y 70/00* (2014.12); *B33Y 80/00* (2014.12); *E04G 21/0463* (2013.01); *E04H 12/12* (2013.01); *F03D 13/20* (2016.05); *F05B 2230/31* (2013.01); *F05B 2240/122* (2013.01)

(58) Field of Classification Search
CPC .......... B33Y 10/00; F03D 13/10; F03D 13/20
See application file for complete search history.

(56) References Cited

U.S. PATENT DOCUMENTS

| 9,162,399 B2 | 10/2015 | Gibson et al. |
| 9,567,745 B2 | 2/2017 | Moeller et al. |

(Continued)

FOREIGN PATENT DOCUMENTS

| CN | 107461302 A | 12/2017 |
| CN | 207229307 U | 4/2018 |

(Continued)

OTHER PUBLICATIONS

PCT International Search Report and Opinion Corresponding to PCT/US2018/053477 dated Jun. 24, 2019.

(Continued)

*Primary Examiner* — James Sanders
(74) *Attorney, Agent, or Firm* — Dority & Manning, P.A.

(57) ABSTRACT

A method for manufacturing a tower structure of a wind turbine includes printing, via an additive printing device, the tower structure of the wind turbine of a cementitious material. The method also includes printing, via the additive printing device, one or more additional airflow modifying features on an outer surface the tower structure of the wind turbine so as to reduce and/or prevent vortex shedding, excitation, and/or drag of the tower structure. Further, the method includes curing the cementitious material so as to form the tower structure.

16 Claims, 8 Drawing Sheets

(51) Int. Cl.
*B33Y 70/00* (2020.01)
*B33Y 80/00* (2015.01)
*E04G 21/04* (2006.01)
*E04H 12/12* (2006.01)
*F03D 13/20* (2016.01)

(56) References Cited

U.S. PATENT DOCUMENTS

| | | |
|---|---|---|
| 9,567,981 B2 | 2/2017 | Schibsbye |
| 9,624,667 B2 | 4/2017 | Gibson et al. |
| 11,131,109 B2 | 9/2021 | Ma |
| 2011/0138704 A1 | 6/2011 | Bagepalli et al. |
| 2015/0252582 A1 | 9/2015 | Stiesdal |
| 2017/0016244 A1 | 1/2017 | Keller et al. |
| 2018/0223794 A1 | 8/2018 | Tobin et al. |

FOREIGN PATENT DOCUMENTS

| | | |
|---|---|---|
| DE | 102011078016 A1 | 12/2012 |
| DE | 202018003615 U1 | 8/2013 |
| WO | 2015131174 A1 | 9/2015 |

OTHER PUBLICATIONS

Basalt Rebar, The Ultimate Structural Component, Basalt Coil Re-Bar, 19 Pages. http://diamondbasalt.com/basalt-rebar/.
Mostert, The FRP Pillar—Graduation, Bars Are Linear See Small Scale Demo, 6 pages. https://pierremostert.com/frppillar/.
The First Examination Report for IN application No. 202117011585, dated Sep. 14, 2022, 8 pages.
CN Office Action CN2018800998835 on Jan. 26, 2024.

METHOD FOR MANUFACTURING WIND TURBINE TOWER STRUCTURE FOR PREVENTING VORTEX SHEDDING

FIELD

The present disclosure relates in general to wind turbine towers, and more particularly to methods of manufacturing wind turbine tower structures for preventing vortex shedding, reducing drag, and/or reinforcing the structures.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The wind turbine tower is generally constructed of steel tubes, prefabricated concrete sections, or combinations thereof. Further, the tubes and/or concrete sections are typically formed off-site, shipped on-site, and then arranged together to erect the tower. For example, one manufacturing method includes forming pre-cast concrete rings, shipping the rings to the site, arranging the rings atop one another, and then securing the rings together. As wind turbines continue to grow in size, however, conventional manufacturing methods are limited by transportation regulations that prohibit shipping of tower sections having a diameter greater than about 4 to 5 meters. Thus, certain tower manufacturing methods include forming a plurality of arc segments and securing the segments together on site to form the diameter of the tower, e.g. via bolting. Such methods, however, require extensive labor and can be time-consuming.

In addition, cylindrical towers can cause vortex shedding, which generally refers to an oscillating flow that takes place when air flows past the bluff (as opposed to streamlined) body at certain velocities, depending on the size and shape of the tower. Thus, in the oscillating flow, vortices are created at the back of the body and detach periodically from either side thereof. Therefore, the fluid flow past the body creates alternating low-pressure vortices on the downstream side of the body. If the bluff body is not mounted rigidly and the frequency of vortex shedding matches the resonance frequency of the tower, then the tower can begin to resonate, vibrating with harmonic oscillations driven by the energy of the flow. In addition, the aerodynamic drag on the tower increases the load on the structure as well as reduces the wind velocity which can have a negative effect on a downwind rotor machine.

In view of the foregoing, the art is continually seeking improved methods for manufacturing wind turbine towers. Accordingly, the present disclosure is directed to methods for manufacturing wind turbine tower structures that address the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method for manufacturing a tower structure of a wind turbine. The method includes printing, via an additive printing device, the tower structure of the wind turbine of a cementitious material. The method also includes printing, via the additive printing device, one or more additional airflow modifying features on an outer surface the tower structure of the wind turbine so as to reduce and/or prevent vortex shedding, excitation, and/or drag of the tower structure. Further, the method includes curing the cementitious material so as to form the tower structure.

In one embodiment, the additional airflow modifying feature(s) may include strakes, scallops, protrusions, dimples, one or more coils wrapped at least partially around the tower structure, or combinations thereof. In another embodiment, the method may include printing, via the additive printing device, the tower structure of the wind turbine of the cementitious material to have a non-cylindrical shape as to further reduce and/or prevent vortex shedding, excitation, and/or drag of the tower structure.

In additional embodiments, during printing, the method may include embedding one or more reinforcement elements at least partially within the cementitious material at one or more locations of the tower structure. In such embodiments, embedding the one or more reinforcement elements at least partially within the cementitious material at one or more locations may include printing, via the additive printing device, the reinforcement element(s) within the cementitious material at the one or more locations during printing of the tower structure. More specifically, in one embodiment, the reinforcement element(s) may include elongated cables or wires, helical cables or wires, reinforcing bars, metallic or polymeric reinforcing fibers, reinforcing metallic rings couplings, and/or mesh. Such elements can be either statically placed in the tower structure to provide concrete reinforcement or post-tensioned after the cementitious material has cured to put the tower structure into compression.

In several embodiments, the method may include providing one or more molds of the tower structure on a foundation of the wind turbine and printing, via the additive printing device, the tower structure of the wind turbine within the one or more molds. In such embodiments, the method may also include printing, via the additive printing device, the one or more molds of the tower structure.

In another aspect, the present disclosure is directed to a method for manufacturing a tower structure of a wind turbine. The method includes printing, via an additive printing device, the tower structure of the wind turbine of a cementitious material on a foundation of the tower structure. Further, the method includes curing the cementitious material so as to form the tower structure. In addition, the method includes providing one or more reinforcement cables on an outer surface of the tower structure. Moreover, the method include printing, via the additive printing device, one or more additional airflow modifying features on the outer surface the tower structure of the wind turbine so as to reduce and/or prevent vortex shedding, excitation, and/or drag of the tower structure during installation, idling, service, or operation of the wind turbine.

In one embodiment, providing the reinforcement cable(s) on the outer surface of the tower structure may include wrapping the reinforcement cable(s) in the same direction around the tower structure with variable spacing between wraps and tensioning the reinforcement cable(s) on the outer surface of the tower structure to provide a varied compression level to the tower structure. Alternatively, providing the reinforcement cable(s) on the outer surface of the tower structure may include wrapping a plurality of reinforcement cables in opposing directions around the tower structure with constant spacing between wraps and tensioning the reinforcement cable(s) on the outer surface of the tower structure to provide a uniform compression level to the tower structure. This compression acts in both the axial (i.e. height) direction as well as the horizontal (i.e. hoop) direction, allowing the cementitious material of the tower structure to be optimized, thereby reducing the amount of cementitious material required in the tower structure as compared to conventional methods.

In another embodiment, providing the one or more reinforcement cables on the outer surface of the tower structure may include pre-tensioning the reinforcement cable(s) before providing the reinforcement cable(s) on the outer surface of the tower structure and releasing the one or more pre-tensioned reinforcement cable(s) after curing the cementitious material.

In further embodiments, providing the reinforcement cable(s) on the outer surface of the tower structure may include printing, via the additive printing device, the reinforcement cable(s) on the outer surface of the tower structure. In several embodiments, the reinforcement cable(s) may include, for example, solid reinforcing bars, hollow reinforcing bars, pultruded reinforcing bars, and/or mesh. It should be further understood that the method may further include any of the additional features and/or steps as described herein.

In yet another aspect, the present disclosure is directed to a tower structure for a wind turbine. The tower structure includes a tower wall formed, at least in part, of a cementitious material and one or more additional airflow modifying features additively printed onto an outer surface of the tower wall of the wind turbine so as to reduce and/or prevent vortex shedding, excitation, and/or drag of the tower structure during installation, idling, service, or operation of the wind turbine. It should be understood that the tower structure may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
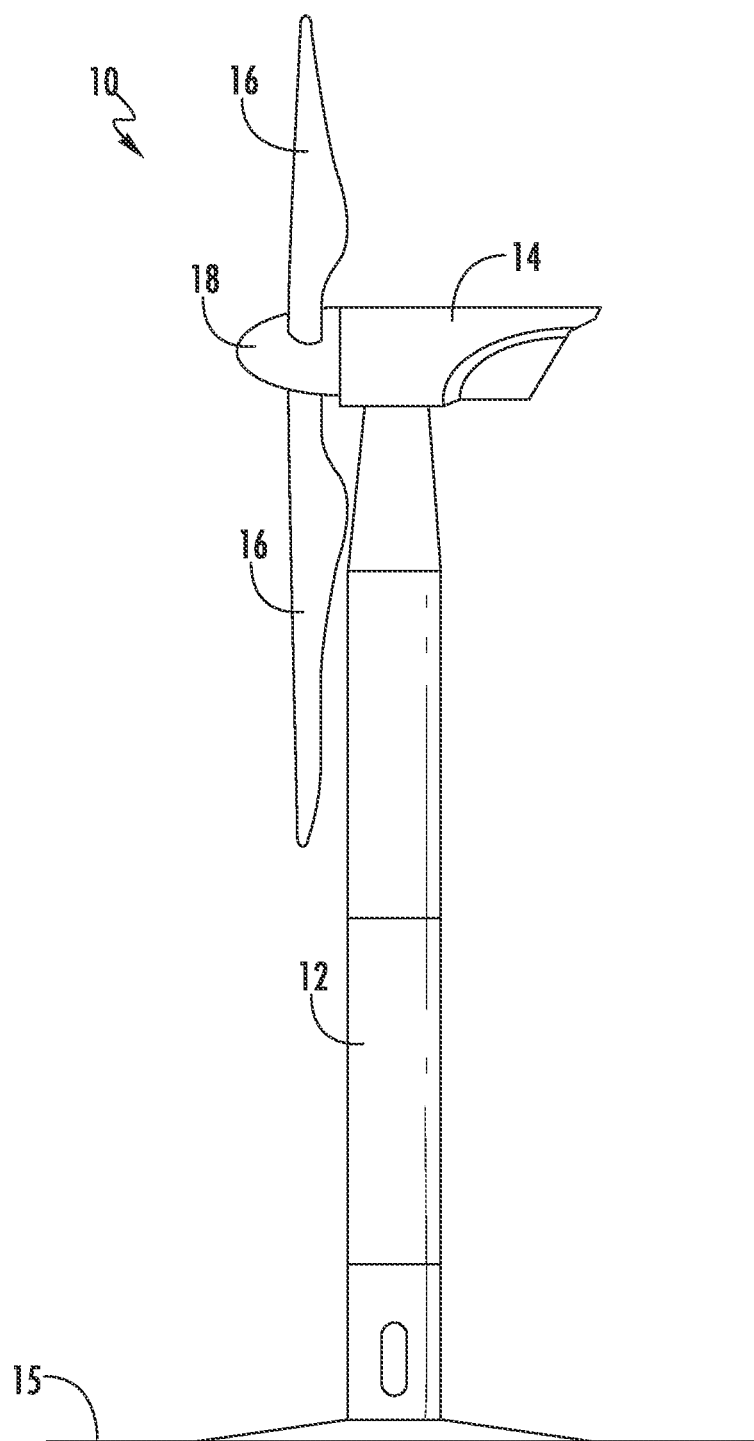
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to methods for manufacturing wind turbine towers using automated deposition of cementitious materials via technologies such as additive manufacturing, 3-D Printing, spray deposition, extrusion additive manufacturing, concrete printing, automated fiber deposition, as well as other techniques that utilize computer numeric control and multiple degrees of freedom to deposit material. More specifically, methods of the present disclosure include printing features or alternate geometry in concrete wind turbine towers to eliminate the potential of vortex shedding. For example, in certain embodiments, the printed features/geometry may include printed-in strakes or a predetermined outside profile (e.g. a scalloped edge, dimples, etc.).

Referring now to the drawings, FIG. 1 illustrates one embodiment of a wind turbine 10 according to the present disclosure. As shown, the wind turbine 10 includes a tower 12 extending from a foundation 15 or support surface with a nacelle 14 mounted atop the tower 12. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbine towers, but may be utilized in any application having concrete constructions and/or tall towers in addition to wind towers, including for example homes, bridges, tall towers and other aspects of the concrete industry. Further, the methods described herein may also apply to manufacturing any similar structure that benefits from the advantages described herein.

Figure 2:
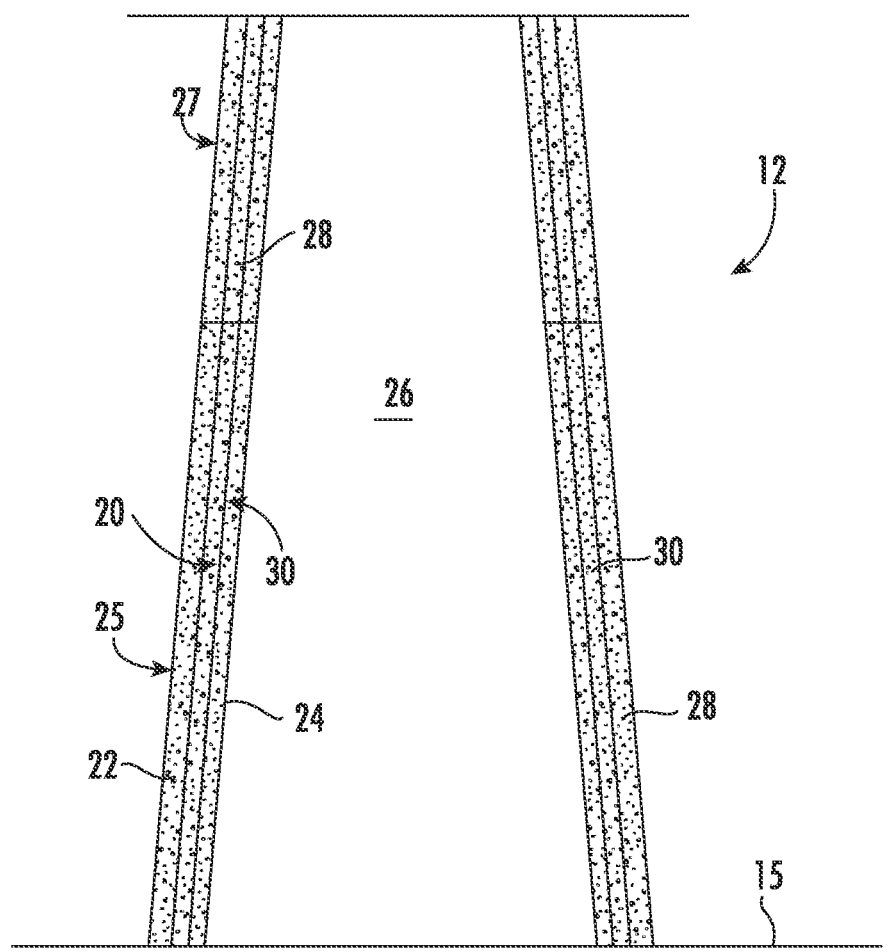
FIG. 2 illustrates a cross-sectional view of one embodiment of a tower structure of a wind turbine according to the present disclosure.

Referring now to FIG. 2, a partial, cross-sectional view of one embodiment of the tower structure 12 of the wind turbine 10 according to the present disclosure is illustrated. As shown, the tower structure 12 may be formed from a plurality of sections 25, 27. More specifically, as shown, the tower structure 12 may have a first tower section 25 and a second tower section 27. In addition, the illustrated tower 12 defines a circumferential tower wall 20 having an outer surface 22 and an inner surface 24. Further, as shown, the circumferential tower wall 20 generally defines a hollow interior 26 that is commonly used to house various turbine components (e.g. a power converter, transformer, etc.) along different locations in the tower 12. In addition, as will be described in more detail below, the tower structure 12 is formed, at least in part, using additive manufacturing. Moreover, as shown, the tower structure 12 is formed, at least in part, of a cementitious material 28 that may be reinforced with one or more reinforcement elements 30. In particular embodiments, the reinforcement element(s) 30 described herein may include, for example, elongated cables or wires, reinforcing bars (hollow or solid), reinforcing fibers (metallic or polymeric), reinforcing metallic rings (circular, oval, spiral and others as may be relevant) or couplings, mesh, and/or any such structures as may be known in the art to reinforce concrete structures. As such, the reinforced tower structure 12 is configured to withstand wind loads that can cause the tower 12 to be susceptible to cracking. In addition, as used herein, the cementitious material 28 may include any suitable workable paste that is configured to bind together after curing to form a structure. Suitable cementitious materials include, for example, concrete, pitch resin, asphalt, clay, cement, cementitious compositions, or similar.

Figure 3:
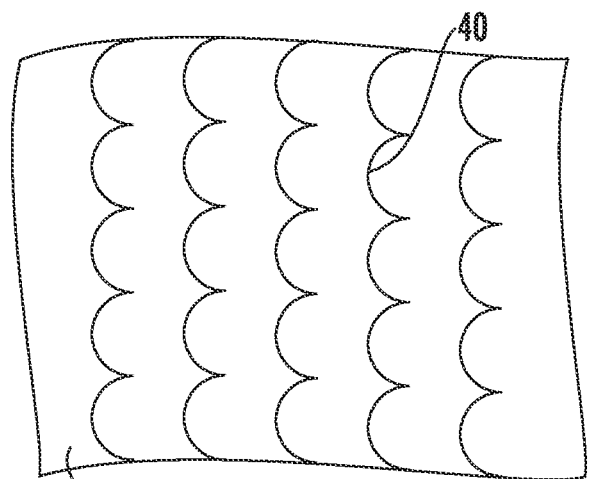
FIG. 3 illustrates a detailed, close-up view of a portion of one embodiment of a tower structure of a wind turbine according to the present disclosure.

Referring now to FIG. 3, a detailed, close-up view of the outer surface 22 of the tower structure 12 is illustrated. As shown, the illustrated tower structure 12 includes one or more additional airflow modifying features 40 additively printed on the outer surface 22 the tower structure 12 of the wind turbine 10 so as to reduce and/or prevent vortex shedding, excitation, and/or drag of the tower structure 12. For example, the additional airflow modifying feature(s) 40 described herein, may include strakes, scallops, protrusions, dimples, one or more coils wrapped at least partially around the tower structure 12, or combinations thereof. More specifically, as shown in the illustrated embodiment, the additional airflow modifying feature 40 corresponds to a plurality of scallops.

Referring now to FIGS. 4-9, the present disclosure is directed to methods of manufacturing wind turbine tower structures for preventing vortex shedding, excitation, and/or drag, e.g. via additive manufacturing. Additive manufacturing, as used herein, is generally understood to encompass processes used to synthesize three-dimensional objects in which successive layers of material are formed under computer control to create the objects. As such, objects of almost any size and/or shape can be produced from digital model data. It should further be understood that the additive manufacturing methods of the present disclosure may encompass three degrees of freedom, as well as more than three degrees of freedom such that the printing techniques are not limited to printing stacked two-dimensional layers, but are also capable of printing curved and/or irregular shapes.

Figure 4:
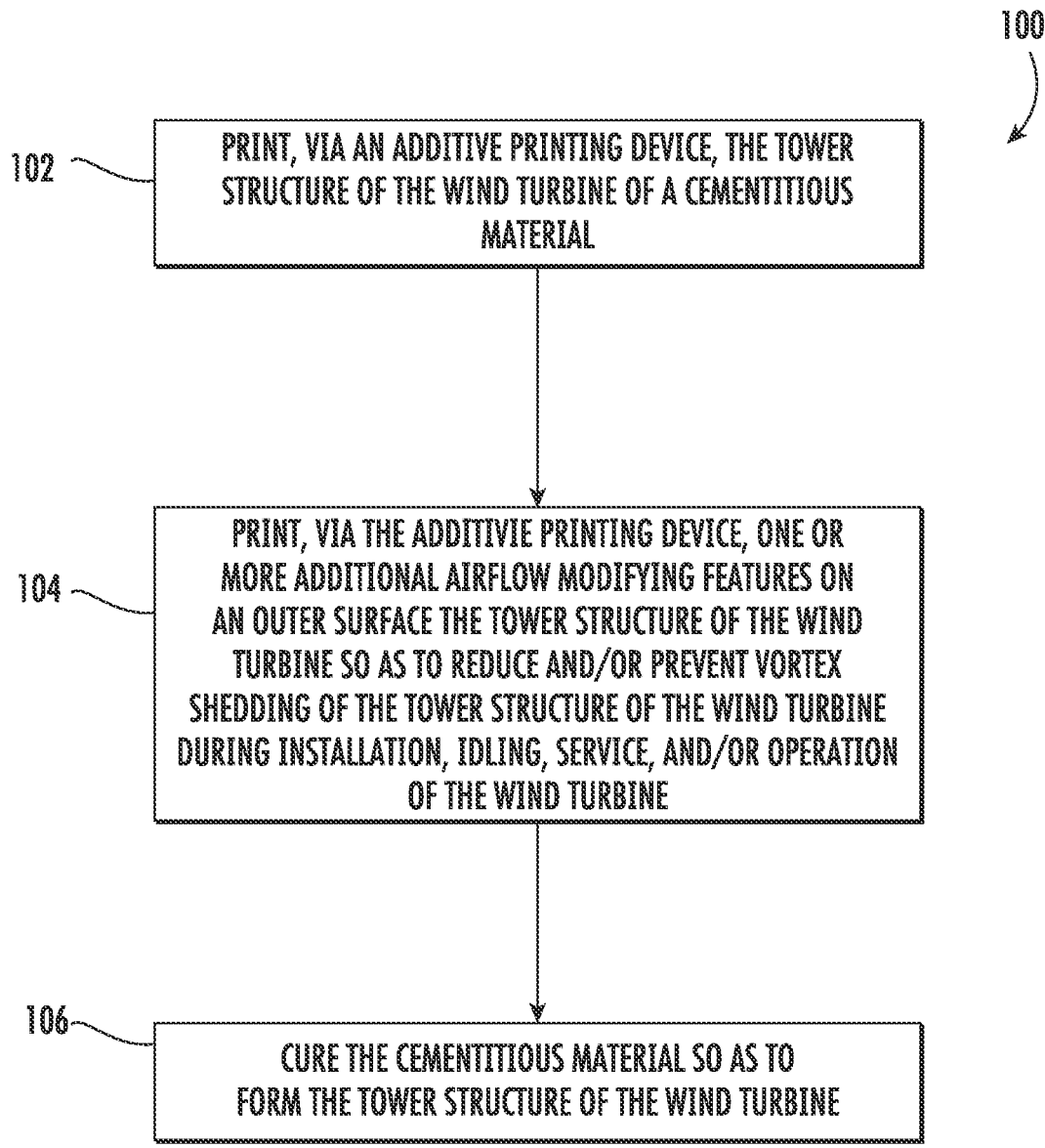
FIG. 4 illustrates a flow diagram of one embodiment of a method for manufacturing a tower structure of a wind turbine at a wind turbine site according to the present disclosure.

Referring particularly to FIG. 4, a flow diagram of one embodiment of a method 100 for manufacturing a tower structure of a wind turbine at a wind turbine site to reduce and/or prevent vortex shedding, excitation, and/or drag of the tower structure is illustrated. In general, the method 100 will be described herein with reference to the wind turbine 10 and the tower structure 12 shown in FIGS. 1-3. However, it should be appreciated that the disclosed method 100 may be implemented with tower structures having any other suitable configurations. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Figure 5:
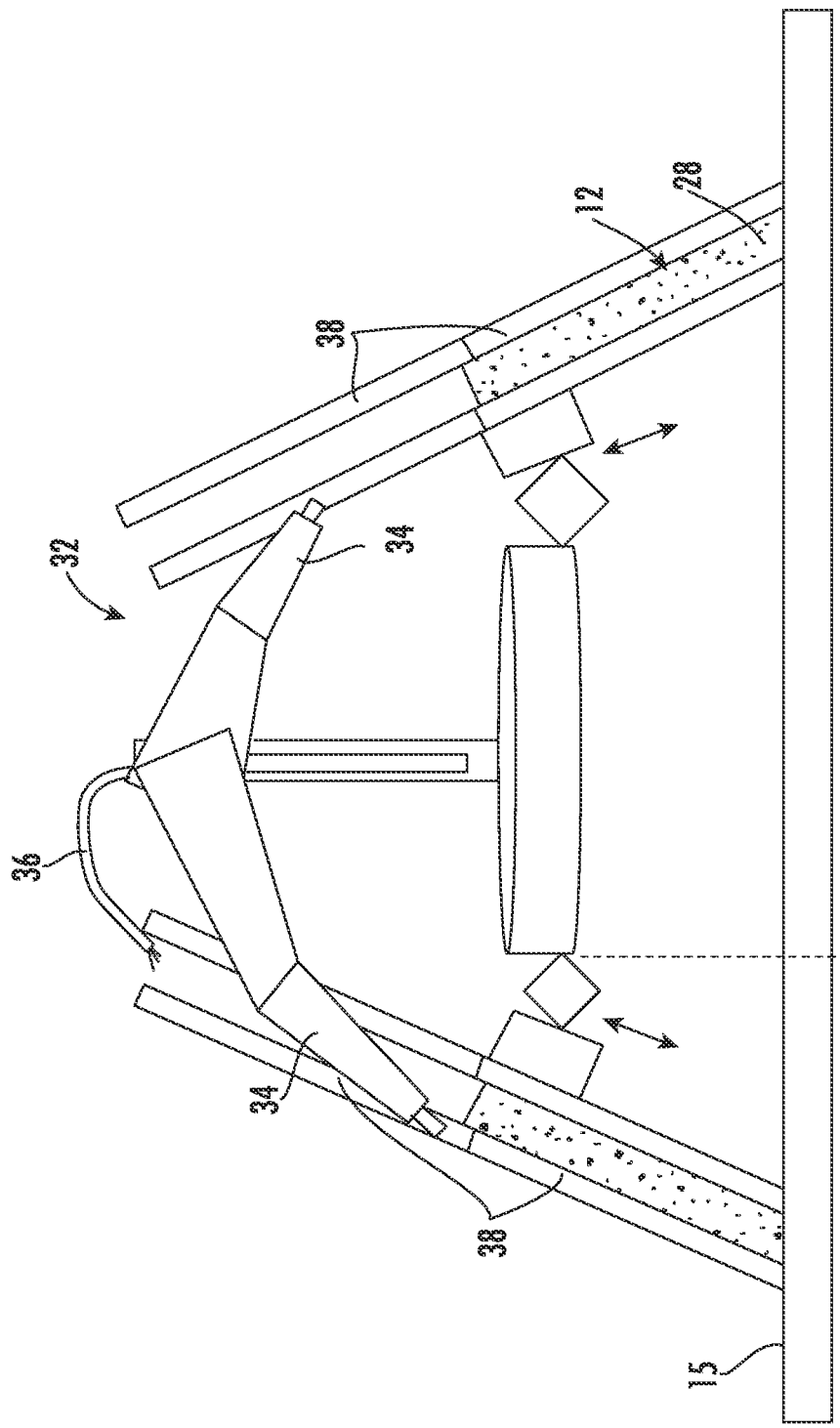
FIG. 5 illustrates a schematic diagram of one embodiment of an additive printing device configured for printing a tower structure of a wind turbine according to the present disclosure.

As shown at (102), the method 100 may include printing, via an additive printing device 32, the tower structure 12 of the wind turbine 10 of the cementitious material 28. For example, as shown in FIG. 5, a schematic diagram of one embodiment of the additive printing device 32 according to the present disclosure is illustrated. It should be understood that the additive printing device 32 described herein generally refers to any suitable additive printing device having one or more nozzles for depositing material (such as the cementitious material 28) onto a surface that is automatically controlled by a controller (such as controller 44) to form an object programmed within the computer (such as a CAD file). More specifically, as shown, the additive printing device 32 may include one or more nozzles 34 for depositing various materials. For example, as shown in the illustrated embodiment, the additive printing device 32 includes two nozzles 34. In further embodiments, the additive printing device 32 may include any suitable number of nozzles 34. In addition, the additive printing device 32 may include an injector 36, which is discussed in more detail below.

Still referring to FIG. 5, the method 100 may include providing one or more molds 38 of the tower structure 12, e.g. on the foundation 15 of the wind turbine 10. It should be understood that the molds 38 described herein may be solid, porous, and/or printed with openings to inject the cementitious material 38. In addition, in one embodiment, the mold(s) 38 may be prefabricated and delivered to the wind turbine site. In alternative embodiments, as shown in FIG. 5, the additive printing device 32 may also be configured to print the mold(s) 38 of the tower structure 12. For example, as shown, one of the nozzles 34 may be configured to dispense a polymer material for building up the mold(s) 38 on the foundation 15 of the wind turbine 10 (or any other suitable on-site location).

Suitable polymer materials may include, for example, a thermoset material, a thermoplastic material, a biodegradable polymer (such as a corn-based polymer system, fungal-like additive material, or an algae-based polymer system) that is configured to degrade/dissolve over time, or combinations thereof. As such, in one embodiment, the outer polymer mold may be biodegradable over time, whereas the inner polymer mold remains intact. In alternative embodiments, the outer and inner molds may be constructed of the same material.

In such embodiments, as shown, the additive printing device 32 may be configured to fill the mold(s) 38 of the tower structure 12 with the cementitious material 28. More specifically, as shown, one or more of the nozzles 34 may be configured to print the cementitious material 28 into the molds 38. In alternative embodiments, rather than printing the cementitious material 28, the injector 36 of the additive printing device 32 may simply inject or fill the mold(s) 38 with the cementitious material 28, e.g. by injecting the cementitious material 28 from the top of the molds 38 or by injecting the cementitious material 28 through openings in the mold.

In additional embodiments, during printing, the method 100 may include embedding one or more of the reinforcement elements 30 at least partially within the cementitious material 28 at one or more locations of the tower structure 12. In such embodiments, the additive printing device 32 may be configured to print the reinforcement element(s) 30 within the cementitious material 28 at the one or more locations during printing of the tower structure 12.

In further embodiments, the additive printing device 32 is configured to print the cementitious material 28 in a manner that accounts for the cure rate thereof such that the tower structure 12, as it is being formed, can bond to itself. In addition, the additive printing device 32 is configured to print the tower structure 12 in a manner such that it can withstand the weight of the wall 20 as the additively-formed cementitious material 28 can be weak during printing. In certain embodiments, the method 100 may include printing, via the additive printing device 32, the tower structure 12 to have a non-cylindrical or alternative shape as to further reduce and/or prevent vortex shedding, excitation, and/or drag of the tower structure 12.

Referring back to FIG. 4, as shown at (104), the method 100 may also include printing, via the additive printing device 32, one or more of the additional airflow modifying features 40 on the outer surface 22 the tower structure 12 of the wind turbine 10 so as to reduce and/or prevent vortex shedding, excitation, and/or drag of the tower structure 12. For example, the additional airflow modifying feature(s) 40 described herein, may include strakes, scallops, protrusions, dimples, one or more coils wrapped at least partially around the tower structure 12, or combinations thereof. As shown at (106), the method 100 may further include curing the cementitious material 28 so as to form the tower structure 12.

Figure 6:
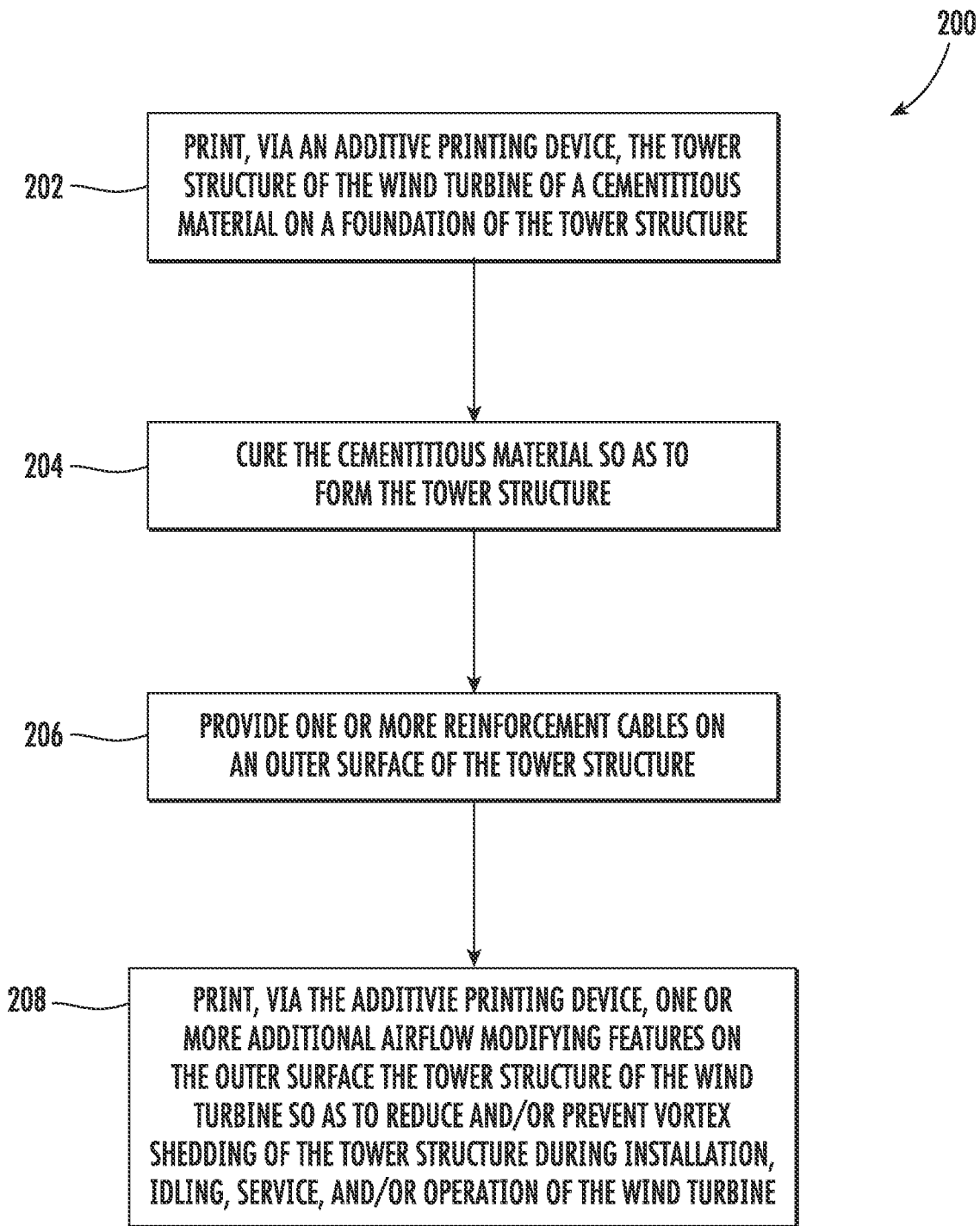
FIG. 6 illustrates a flow diagram of one embodiment of a method for manufacturing a tower structure of a wind turbine at a wind turbine site according to the present disclosure.

Referring particularly to FIG. 6, a flow diagram of another embodiment of a method 200 for manufacturing a tower structure of a wind turbine at a wind turbine site to reduce and/or prevent vortex shedding, excitation, and/or drag of the tower structure is illustrated. In general, the method 200 will be described herein with reference to the wind turbine 10 and the tower structure 12 shown in FIGS. 1-3. However, it should be appreciated that the disclosed method 200 may be implemented with tower structures having any other suitable configurations. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 may include printing, via the additive printing device 32, the tower structure 12 of the wind turbine 10 of the cementitious material 28 on a foundation of the tower structure 12, such as the foundation 15 of the wind turbine 10. For example, as mentioned, the additive printing device 32 may be configured to print the tower structure 12 of the cementitious material 28 and/or may fill one or more molds 38 with the cementitious material 28 as described herein. As shown at (204), the method 200 may include curing the cementitious material 28 so as to form the tower structure 12.

As shown at (206), the method 200 may include providing one or more reinforcement cables 30 on the outer surface 22 of the tower structure 12. For example, in one embodiment, the additive printing device 32 may be configured to print the reinforcement cable(s) 30 on the outer surface 22 of the tower structure 12. In several embodiments, the reinforcement cable(s) 30 may include, for example, solid reinforcing bars, hollow reinforcing bars, pultruded reinforcing bars, and/or mesh. In addition, the reinforcement cable(s) 30 may be constructed of any suitable material, including for example, a metal or metal alloy (such as steel), a composite material, basalt, or similar.

Figure 7:
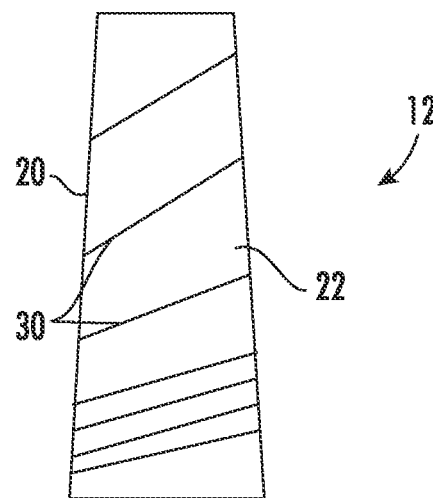
FIG. 7 illustrates a perspective view of one embodiment of a tower structure of a wind turbine according to the present disclosure, particularly illustrating reinforcement cables wrapped on the outer surface of the tower structure in the same direction with variable spacing between wraps.
Figure 8:
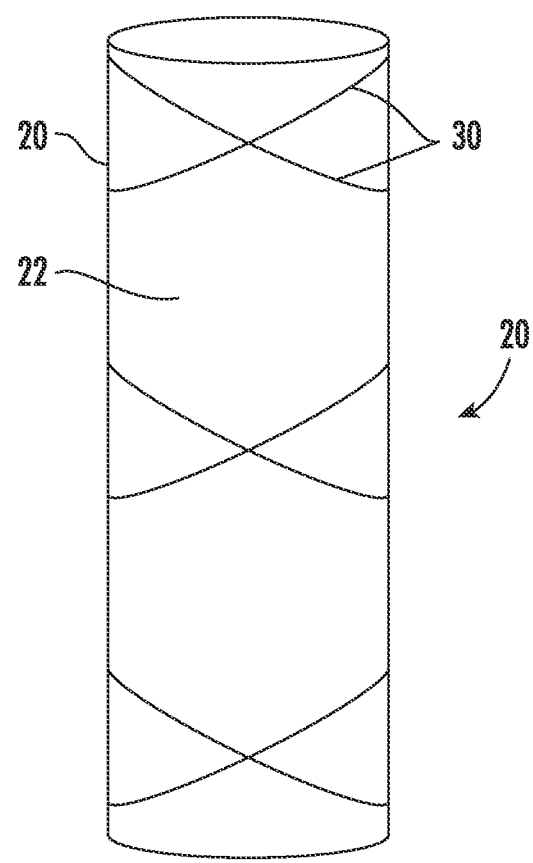
FIG. 8 illustrates a perspective view of another embodiment of a tower structure of a wind turbine according to the present disclosure, particularly illustrating reinforcement cables wrapped on the outer surface of the tower structure in opposing direction with constant spacing between wraps.
Figure 9:
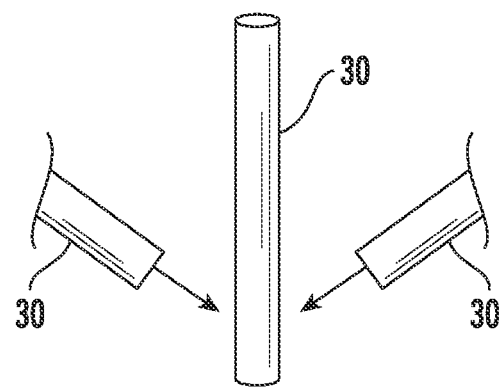
FIG. 9 illustrates a detailed portion of a portion of the tower structure of FIG. 8, particularly illustrating opposing reinforcement cables being double-sided printed from a vertical-extending rebar.
Figure 10:
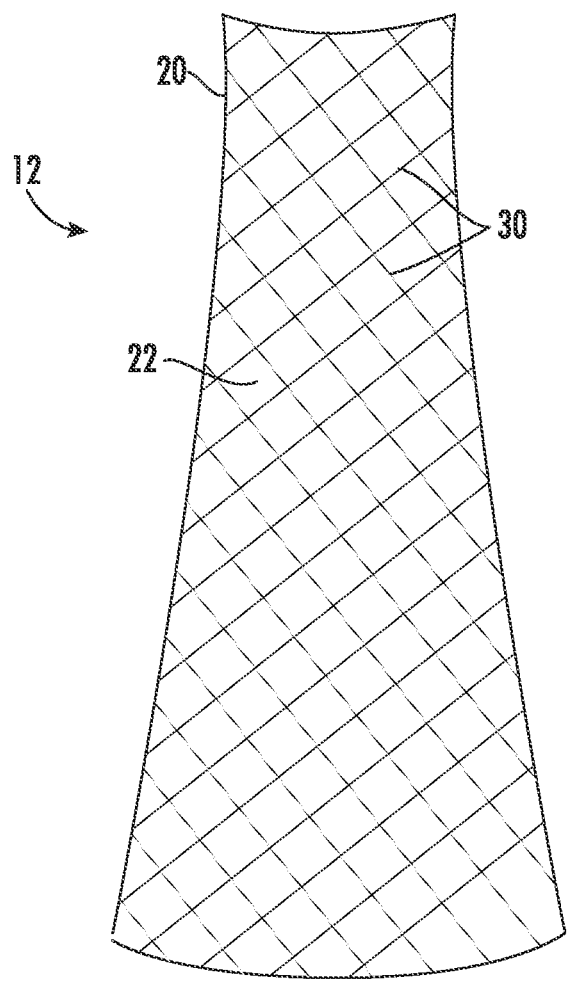
FIG. 10 illustrates perspective view of still another embodiment of a tower structure of a wind turbine according to the present disclosure, particularly illustrating pre-tensioned reinforcement cables wrapped on the outer surface of the tower structure.

Further, in certain embodiments, as shown in FIG. 7, the method 200 may include wrapping the reinforcement cable(s) 30 in the same direction around the tower structure 12 with variable spacing between wraps and tensioning the reinforcement cable(s) 30 on the outer surface 22 of the tower structure 12 to provide a varied compression level to the tower structure 12. In alternative embodiments, as shown in FIGS. 8 and 9, the method 200 may include wrapping a plurality of the reinforcement cables 30 in opposing directions around the tower structure 12 with constant spacing between wraps and tensioning the reinforcement cable(s) 30 on the outer surface 22 of the tower structure 12 to provide a uniform compression level to the tower structure 12. More specifically, as shown in FIG. 9, opposing reinforcement cable(s) 0 may be double-sided printed from a vertically-extending rebar. In such embodiments, the reinforcement cables 30 provide compression in the hoop and elevation directions. In still another embodiment, as shown in FIG. 10, the method 200 may include pre-tensioning the reinforcement cable(s) 30 before providing the reinforcement cable(s) 30 on the outer surface 22 of the tower structure 12 and releasing the pre-tensioned reinforcement cable(s) 30 after curing the cementitious material 28.

Referring back to FIG. 6, as shown at (208), the method 200 may include printing, via the additive printing device 32, one or more of the additional airflow modifying features 40 on the outer surface 22 the tower structure 12 of the wind turbine 10 so as to reduce and/or prevent vortex shedding, excitation, and/or drag of the tower structure 12 during installation, idling, service, or operation of the wind turbine 10.

Figure 11:
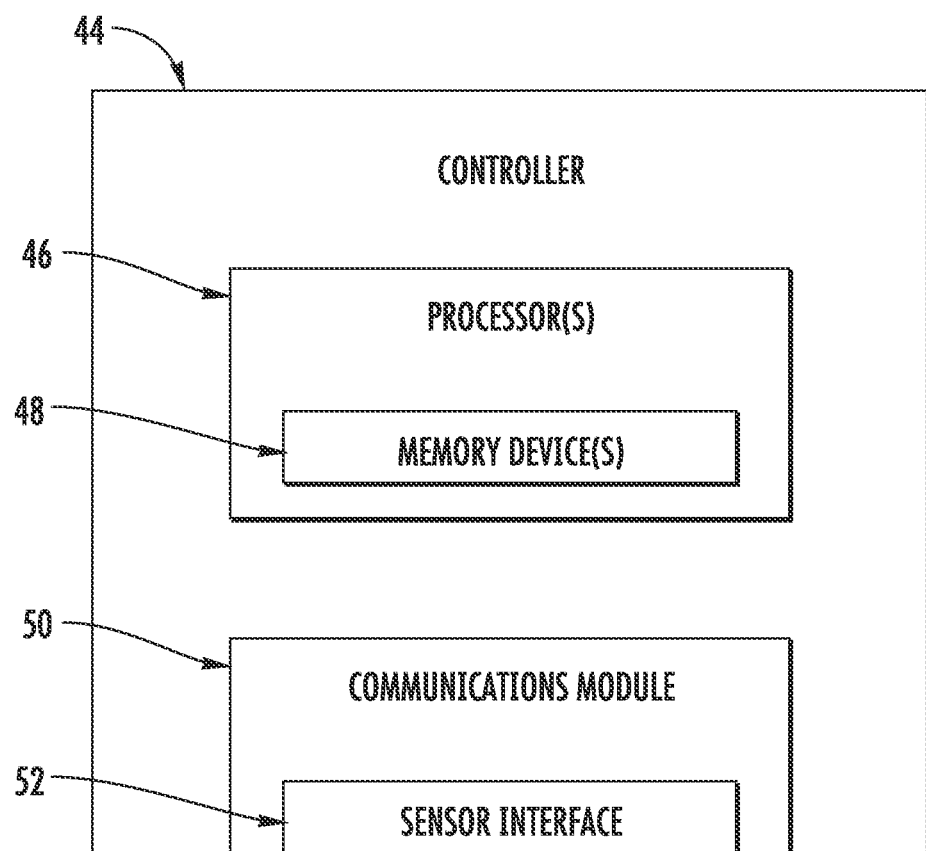
FIG. 11 illustrates a block diagram of one embodiment of a controller of an additive printing device according to the present disclosure.

Referring now to FIG. 11, a block diagram of one embodiment of the controller 44 of the additive printing device 32 is illustrated. As shown, the controller 44 may include one or more processor(s) 46 and associated memory device(s) 48 configured to perform a variety of computer-implemented functions (e.g., performing the methods, steps, calculations and the like and storing relevant data as disclosed herein). Additionally, the controller 44 may also include a communications module 50 to facilitate communications between the controller 44 and the various components of the additive printing device 32. Further, the communications module 50 may include a sensor interface 52 (e.g., one or more analog-to-digital converters) to permit signals transmitted from one or more sensors to be converted into signals that can be understood and processed by the processors 46. It should be appreciated that the sensors may be communicatively coupled to the communications module 50 using any suitable means, including e.g. a wired connection and a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 46 is also configured to compute advanced control algorithms and communicate to a variety of Ethernet or serial-based protocols (Modbus, OPC, CAN, etc.). Additionally, the memory device(s) 48 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 48 may generally be configured to store suitable computer-readable instructions that, when implemented by the processor(s) 46, configure the controller 44 to perform the various functions as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a tower structure of a wind turbine, the method comprising:
    printing, via an additive printing device, the tower structure of the wind turbine of a cementitious material;
    printing, via the additive printing device, at least one of a plurality of scallops or a plurality of dimples on an outer surface of the tower structure of the wind turbine so as to reduce and/or prevent vortex shedding, excitation, and/or drag of the tower structure of the wind turbine during installation, idling, service, or operation of the wind turbine; and,
    curing the cementitious material so as to form the tower structure of the wind turbine.

2. The method of claim 1, further comprising printing, via the additive printing device, the tower structure of the wind turbine of the cementitious material to have a non-cylindrical shape as to further reduce and/or prevent vortex shedding, excitation, and/or drag of the tower structure.

3. The method of claim 1, further comprising during printing, embedding one or more reinforcement elements at least partially within the cementitious material at one or more locations of the tower structure.

4. The method of claim 1, wherein embedding the one or more reinforcement elements at least partially within the cementitious material at one or more locations further comprises printing, via the additive printing device, the one or more reinforcement elements within the cementitious material at the one or more locations during printing of the tower structure.

5. The method of claim 4, wherein the one or more reinforcement elements comprise at least one of elongated cables or wires, helical cables or wires, reinforcing bars, metallic or polymeric reinforcing fibers, reinforcing metallic rings couplings, and/or mesh.

6. The method of claim 1, further comprising:
    providing one or more molds of the tower structure on a foundation of the wind turbine; and,
    printing, via the additive printing device, the tower structure of the wind turbine within the one or more molds.

7. The method of claim 6, further comprising printing, via the additive printing device, the one or more molds of the tower structure.

8. A method for manufacturing a tower structure of a wind turbine, the method comprising:
    printing, via an additive printing device, the tower structure of the wind turbine of a cementitious material on a foundation of the tower structure;
    curing the cementitious material so as to form the tower structure;
    providing one or more reinforcement cables on an outer surface of the tower structure; and,
    printing, via the additive printing device, at least one of a plurality of scallops or a plurality of dimples on an outer surface of the tower structure of the wind turbine so as to reduce and/or prevent vortex shedding, excitation, and/or drag of the tower structure during installation, idling, service, or operation of the wind turbine.

9. The method of claim 8, wherein providing the one or more reinforcement cables on the outer surface of the tower structure further comprises:
    wrapping the one or more reinforcement cables in the same direction around the tower structure with variable spacing between wraps; and,
    tensioning the one or more reinforcement cables on the outer surface of the tower structure to provide a varied compression level to the tower structure.

10. The method of claim 8, wherein providing the one or more reinforcement cables on the outer surface of the tower structure further comprises:
    wrapping a plurality of reinforcement cables in opposing directions around the tower structure with constant spacing between wraps; and,
    tensioning the one or more reinforcement cables on the outer surface of the tower structure to provide a uniform compression level to the tower structure.

11. The method of claim 8, wherein providing the one or more reinforcement cables on the outer surface of the tower structure further comprises:
    pre-tensioning the one or more reinforcement cables before providing the one or more reinforcement cables on the outer surface of the tower structure; and,
    releasing the one or more pre-tensioned reinforcement cables after curing the cementitious material.

12. The method of claim 8, wherein providing the one or more reinforcement cables on the outer surface of the tower structure further comprises printing, via the additive printing device, the one or more reinforcement cables on the outer surface of the tower structure.

13. The method of claim 8, wherein the one or more reinforcement cables comprise at least one of solid reinforcing bars, hollow reinforcing bars, pultruded reinforcing bars, and/or mesh.

14. The method of claim 8, further comprising:
providing one or more molds of the tower structure on the foundation of the tower structure; and,
filling, via the additive printing device, the one or more molds with the cementitious material to form the tower structure.

15. The method of claim 14, wherein filling, via the additive printing device, the one or more molds with the cementitious material to form the tower structure further comprises printing, via the additive printing device, the tower structure of the wind turbine within the one or more molds.

16. The method of claim 14, wherein providing the one or more molds of the tower structure on the foundation of the tower structure further comprises printing, via the additive printing device, the one or more molds of the tower structure.

* * * * *